United States Patent [19]

Crawshay

[11] Patent Number: 5,007,525
[45] Date of Patent: Apr. 16, 1991

[54] BELT AND CHAIN FLIGHT CONVEYOR

[75] Inventor: Richard Crawshay, North Vancouver, Canada

[73] Assignee: Inco limited, Toronto, Canada

[21] Appl. No.: 396,277

[22] Filed: Aug. 21, 1989

[30] Foreign Application Priority Data

Oct. 21, 1988 [CA] Canada ................................. 580997

[51] Int. Cl.$^5$ .............................................. B65G 15/44
[52] U.S. Cl. ................................. 198/690.2; 198/721; 198/607
[58] Field of Search .................. 198/308.1, 522, 510.1, 198/690.2, 698, 699, 699.1, 721, 833, 494, 498, 570, 606, 607

[56] References Cited

U.S. PATENT DOCUMENTS

| 508,589 | 11/1883 | Wishard . | |
| 1,626,041 | 4/1927 | Kyle et al. . | |
| 1,636,986 | 7/1927 | Caldwell . | |
| 2,360,282 | 10/1944 | Russell | 198/308.1 |
| 2,964,164 | 12/1960 | Lakso | 198/164 |
| 3,512,282 | 5/1970 | Gurries | 198/308.1 X |
| 3,854,571 | 12/1974 | Siirtola | 198/721 |
| 4,609,099 | 9/1986 | Pentith | 198/833 |
| 4,648,776 | 3/1987 | Hradil et al. | 414/565 |
| 4,749,326 | 6/1988 | Crawshay et al. | 414/565 |

FOREIGN PATENT DOCUMENTS 1191487 8/1985 Canada .
1191488 8/1985 Canada .

Primary Examiner—Joseph E. Valenza
Assistant Examiner—Keith L. Dixon
Attorney, Agent, or Firm—Francis J. Mulligan, Jr.; Edward A. Steen

[57] ABSTRACT

A conveyor including a chain flight conveyor superimposed over an elastic belt conveyor. The juxtaposition of the two conveyors results in longer wear and less erosive friction when compared to sole chain flight systems.

6 Claims, 2 Drawing Sheets

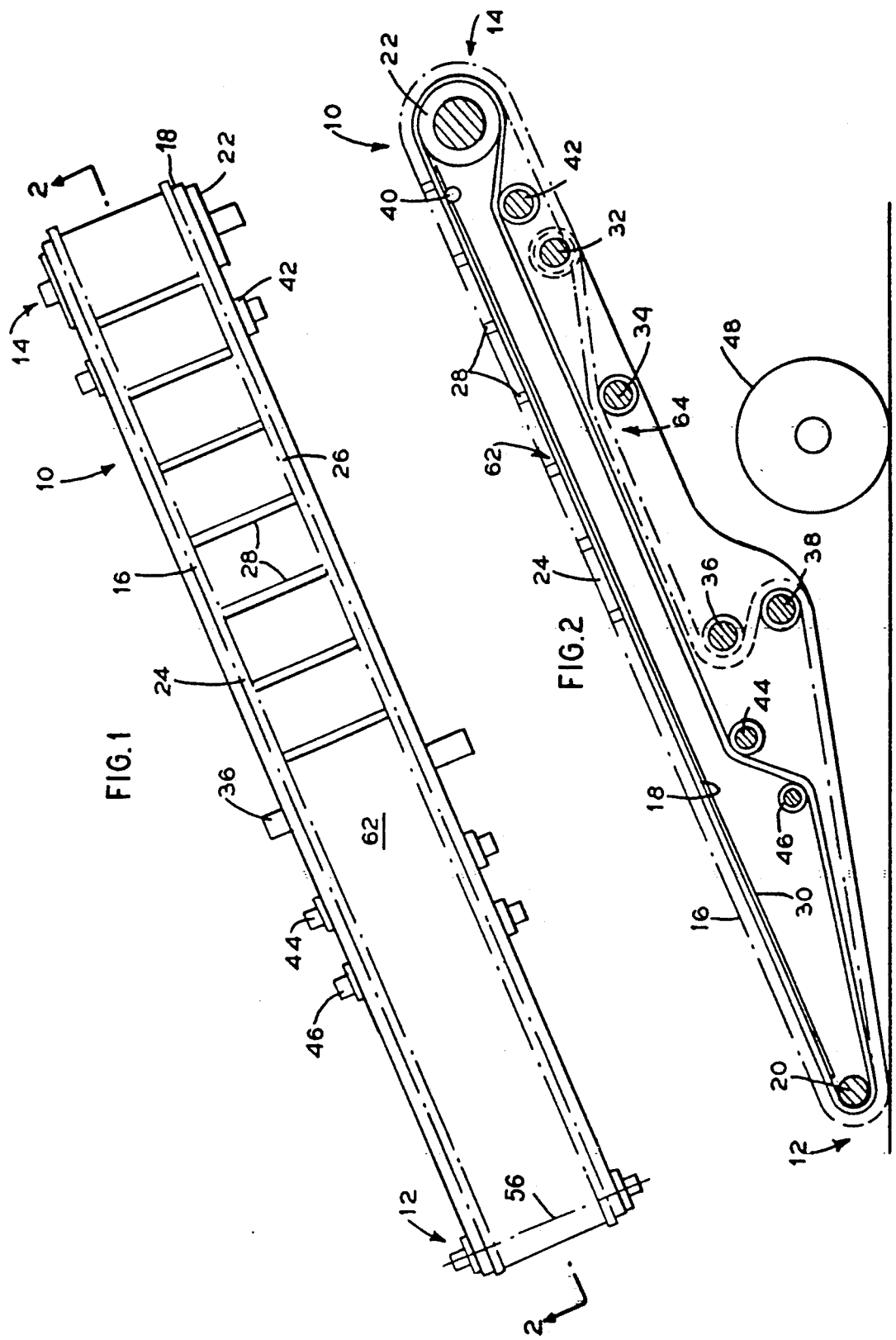

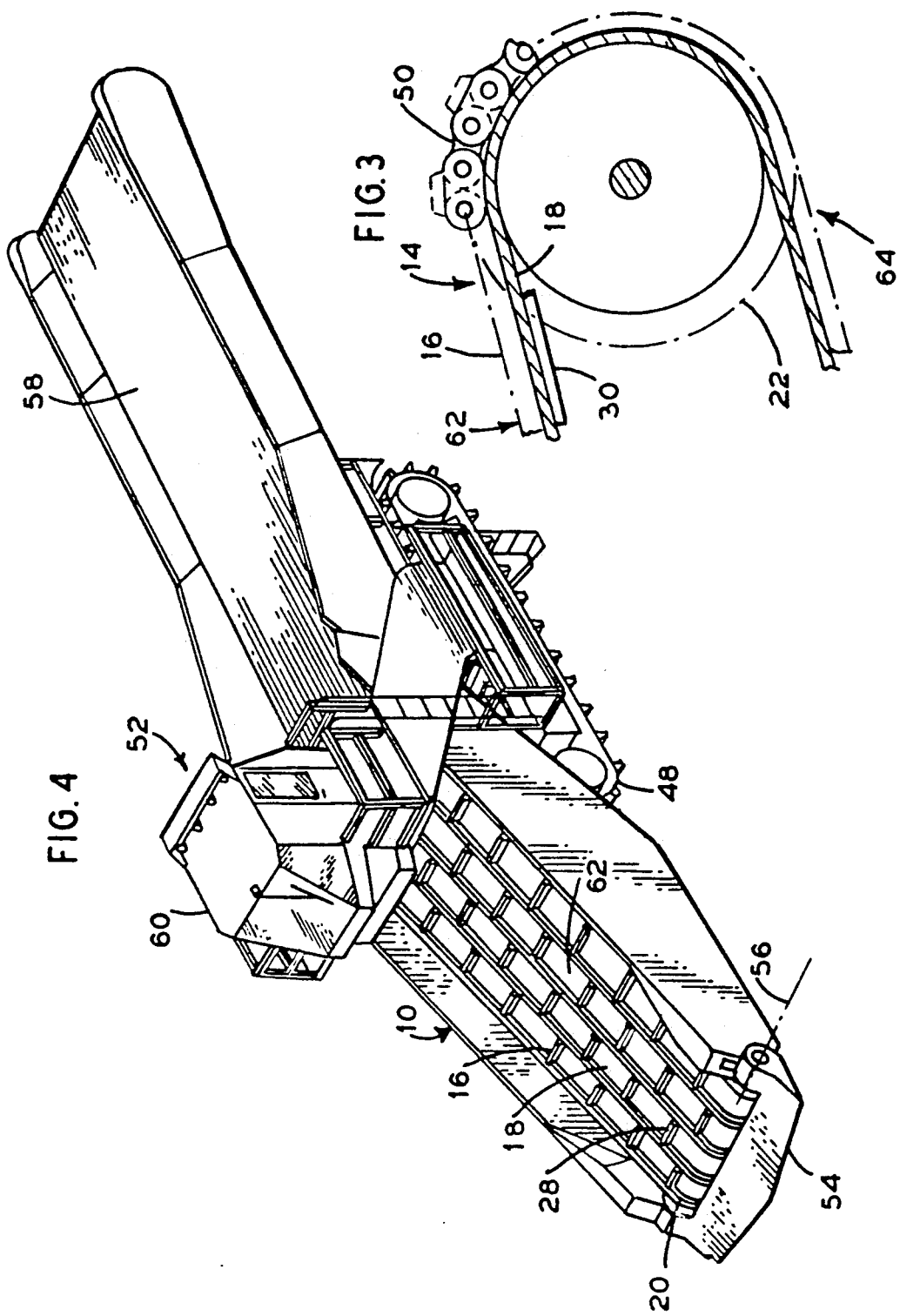

BELT AND CHAIN FLIGHT CONVEYOR

TECHNICAl FIELD

This invention relates to conveying apparatus in general and, more particularly, to a combined belt and chain flight conveyor especially adapted to transport large quantities of ore with reduced wear on the conveyor components.

BACKGROUND ART

In order to increase the efficiency of underground mining operations, mining professionals are increasingly utilizing continuous loading and conveying systems. Less labor intensive, and considerably safer than current batch systems, continuous systems provide faster and larger throughput capacities at lower costs.

One particular continuous system that has received a favorable reception in the mining industry is assignee's OSCILOADER ® continuous loader. The loader conveys large quantities of material away from a muck pile at a high rate. See Canadian Patents 1,191,487 and 1,191,488 and U.S. Pat. Nos. 4,648,776 and 4,749,326.

In brief, the referenced loader utilizes a chain flight conveyor moving above a stationary conveyor bed. The conveyor is used to load and convey abrasive, fragmented ore away from a muck pile and up an incline as the conveyor is advanced into the pile. The conveyor system has the advantage of providing the desirably aggressive and steep angle characteristics of the chain and flight conveyor. The difficulty occurs in that certain moving ore and muck are very erosive. In relatively short order, the friction and high rates of wear caused by the juxtaposition of the moving flights and stationary bed necessitate bed replacement. Chain flights are generally preferred to transport the ore since they are resistant to the damage caused by the moving rock.

Various attempts have been considered to reduce the friction and high wear rates experienced with conventional chain flight conveyors. One arrangement has made use of low friction, high wear resistant stationary plates placed between the moving chain/load mass and the underlying stationary conveyor structure. This arrangement has met with only partial success since the remaining friction level is still too high.

Conventional rubber belt conveyors lack the aggressive loading and steep operating angle characteristics provided by the chain flight conveyor that are required for excavation loading applications.

SUMMARY OF THE INVENTION

Accordingly, there is provided a combined belt and chain flight conveyor system. The system includes a chain flight system superimposed on a moving membrane or belt. Both the belt and the chain flight move at the same speed to protect the underlying conveyor components.

BRIEF DESCRIPTION OF THE DRAWING

FIG. 1 is a plan view of an embodiment of the invention.

FIG. 2 is a cross sectional view taken along line 2—2 in FIG. 1.

FIG. 3 is a detailed elevation of an embodiment of the invention.

FIG. 4 is an isometric view of an apparatus employing an embodiment of the invention.

PREFERRED MODE FOR CARRYING OUT THE INVENTION

Referring to FIGS. 1 and 2, there is shown a belt and chain flight conveyor 10. For a non-limiting frame of reference the forward or proximal portion of the conveyor 10 is designated by the numeral 12 whereas the rear or distal portion of the conveyor 10 is designated by the numeral 14.

The conveyor 10 includes a chain flight conveyor 16 superimposed over a parallel belt conveyor 18. The belt conveyor 18 is wider than the chain flight conveyor 16. The conveyor 10
 e drum pulley assembly 22. Stationary wear plates 30
, provides the lower supporting surface for the conveyor 10.

The chain flight conveyor 16 includes roller chains 24 and 26, links 50 (FIG. 3) and a plurality of chain flights 28.

Simply for descriptive purposes, the transporting leg 62 broadly defines the conveyor 10 above the wear plates 30. The returning leg 64 broadly defines the conveyor 10 below the wear plate 30.

The chain flight conveyor 16, as shown by the non-limiting example, is routed through a series of pulleys and drives in order to maintain proper tensioning, positioning and speed. For example, after revolving about the discharge drum pulley 22, the chain flight conveyor 16 separates from the belt conveyor 18 and passes over chain guide sprocket 32 to chain deflector sprocket 34 to power driven drive sprocket 36. The drive sprocket 36 communicates with a suitable motor, not shown, to cause the chain flight conveyor 16 to locomote in the desired direction.

The chain flight conveyor 16 is then passed about take-up sprocket 38 where it ultimately meets up with the belt conveyor 18 in the ; vicinity of the dual idler pulley 20.

The belt conveyor 18, disposed between the chain flight conveyor 16 and the wear plates 30, passes over training drum idler 40, and the discharge drum pulley assembly 22 until it is routed over the belt idler 42. The belt conveyor 18 passes between take-up idlers 44 and 46 where it ultimately merges with the chain flight conveyor 16.

The conveyor 10 may be mounted over a tracked crawler 48, wheel or other appropriate supporting and-/or moving structure.

FIG. 3 depicts a detailed view of the discharge drum pulley assembly 22. The wear plate 30 extends towards the distal portion 14 of the conveyor 10. The belt conveyor 18 is wrapped around the discharge drum pulley assembly 22. The chain flight conveyor 16 is superimposed above the belt conveyor 18. A plurality of the chain links 50 are shown.

FIG. 4 discloses a mobile continuous loader 52 employing the features of the instant invention in combination with those features claimed in the previously cited patents. The loader 52 includes an oscillatory penetrator 54 pivoting about axis 56. The superimposed chain flight conveyor 16 and belt conveyor 18 rotate about the dual idler pulley assembly 20 and transport the material to second conveyor 58. Both the penetrator 54 and the dual idler pulley assembly 20 share and rotate about the common axis 56. The discharge drum pulley assembly 22 (not shown in FIG. 4) is disposed above the second conveyor 58 and generally underneath the cab 60. Both the scoop 54 and the conveyor 10 may be independently raised and lowered by motive means known to those skilled in the art.

The invention and the matter of applying it may be better understood by a brief discussion of principles underlying the invention.

The belt chain flight conveyor 10 consists of a chain flight system 16 superimposed on a moving membrane or belt 18 which move together to support and transport the material to be conveyed. The moving belt 18 isolates the chain flight system 16 together with the conveyed material from the stationary conveyor structure and attached wear plates 30.

The chain flight system 16 essentially remains in contact with the moving belt 18 on the transporting leg 62 of the conveyor 10 and continues in contact while passing over the discharge drum 22 of the conveyor 10. Soon after leaving the discharge drum 22 on the returning leg 64 of the conveyor 10, the chain flight system 16 separates from the moving belt 18 and passes through the drive 36 and take-up system 38 which acts on the chain flight system. The belt 18 follows a separate path past the chain flight system 16 drive and take-up areas 36, 38, and is reunited with the chain flight system 16 on reaching or before reaching the idler 20 at the proximal portion 12 of the conveyor 10. The belt 18 may be driven either by frictional contact with the chain flight system 16 while passing around the discharge drum 22 or by frictional contact with a separately driven pulley (not shown) or by a combination of these driving forces.

The belt 18 is supported by conventional means or preferably by low friction wear plates 30, made from self lubricating alloys or polymeric materials, attached to the supporting structure. In addition, the friction produced by the sliding contact between the belt 18 and the wear plates 30 may be reduced by the introduction of small quantities of water or other fluid or mixtures of fluids which act as lubricants to reduce starting and running friction; such fluids may be injected through a series of nozzles or slots in the wear plates 30, spaced so as to provide even distribution of the lubricant. The fluids serve also to flush the interface and help remove contaminants which may be introduced in other areas. Impact absorbing wear plates 30 may be provided in areas where material arrives on the conveyor 10 from the pile of material. Flat wear plates 30 are preferred rather than flat or troughing idlers to support the belt 18 because flat plates allow better sealing between the vertical sides of the conveyor 10 and the belt 18 and thus reduce leakage of material out of the conveyor 10. Training idlers or rollers 40 may be provided just ahead of the discharge drum 22 and just ahead of the idler 20 (not shown) to train the belt into the desired path on the conveyor. Such idlers or rollers may be controlled to provide automatic training of the belt 18 in conjunction with sensors known to those in the art which monitor the edge line of the belt 18. Guide sprockets or idlers may be used to guide the chain flight system 16 on the desired path and preferably these should be located just after discharge drum 22 after the point at which the conveyed material has been discharged.

By causing the chain flight system 16 and the belt 18 to separate in the returning leg 64, objectional material entrained in the chains 24, 26 and the links 50 may be expeditiously removed. Some of the material may simply fall away on its own accord whereas other materials may be affirmatively removed. Belt cleaners and chain cleaners may be provided at convenient points in their paths and may be of conventional form.

The reduction in friction brought about by this system results in reduced chain pull requirements which may be used to justify the use of a smaller chain size. This in turn allows the use of smaller drums and pulleys which results in a lower loading height and a more compact conveyor system.

The chains 24 and 26 may be modified to provide a curved edge to the sidebars of the chain link 50, the radius of the curve agreeing with the radius of the outside of the belt 18 in the area of passage over the discharge drum 22. The normal force applied by the chains 24 and 26 to the belt 18 will then be distributed over a greater area thus reducing the unit load and promoting longevity. The width of the chain link 50 sidebars thus modified may be increased to further reduce the unit load. Suitable sealing of the chain articulating bearing surfaces to retain lubricant and keep dirt out may be employed.

When compared to a conventional chain flight conveyor, the combination of the chain flight system 16 with the belt 18 reduces wear between the chain flight 16 and the bed wear plates 30 and reduces wear between the conveyed material and the bed wear plates 30. This greatly reduces the chain link 50 pull required for conveyor operation and reduces the wear rate of the components significantly. The chain flight system 16 affords a measure of protection for the belt 18. Less noise is generated because of reduced friction. Less horsepower is required to drive the conveyor 10 and the starting torque is reduced. Higher speeds can be accommodated; this allows the same output to be conveyed with a reduced material depth and therefore a reduced live load.

Motive power to the drive sprocket 36 and crawler 48 may be supplied by internal combustion engines, electrical motors, hydraulic motors, pneumatic motors or combinations thereof.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

1. A conveying apparatus, the apparatus comprising an endless conveyor having a proximal end and a distal end, the endless conveyor being a transporting leg and a returning leg, the endless conveyor including a belt conveyor and a chain flight conveyor rotating about a pair of opposed sprocketless drums disposed at the proximal end and the distal end, the chain flight conveyor parallel to and in superimposed contact with the belt conveyor for a substantial distance along the transporting leg, the width of the belt conveyor being wider than the chain flight conveyor, means for supporting the endless conveyor, and means for causing the endless conveyor to travel in a predetermined direction.

2. The apparatus according to claim 1 wherein the chain flight conveyor and the belt conveyor are separated and rejoined in the returning leg.

3. The apparatus according to claim 1 wherein the endless conveyor is associated with a second conveyor assembly.

4. The apparatus according to claim 1 wherein an oscillatory penetrator is pivotally mounted coincident with the axis of the proximal end sprocketless drum.

5. The apparatus according to claim 1 wherein the transporting leg is disposed above a flat wear plate.

6. The apparatus according to claim 5 including means for elevating the endless conveyor assembly and the penetrating means.

* * * * *